US012671752B2

(12) United States Patent
Deval et al.

(10) Patent No.: US 12,671,752 B2
(45) Date of Patent: *Jun. 30, 2026

(54) QUICK USER DATAGRAM PROTOCOL (UDP) INTERNET CONNECTIONS (QUIC) PACKET OFFLOADING

(71) Applicant: Intel Corporation, Santa Clara, CA (US)

(72) Inventors: Manasi Deval, Portland, OR (US); Gregory J. Bowers, Hillsboro, OR (US); Joshua A. Hay, Portland, OR (US); Maciej Machnikowski, Wejherowo (PL); Natalia Wochtman, Tomaszow Mazowiecki (PL); Joanna Muniak, Stroza (PL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,250

(22) Filed: Dec. 29, 2023

(65) Prior Publication Data

US 2024/0137430 A1     Apr. 25, 2024

Related U.S. Application Data

(63) Continuation of application No. 16/268,306, filed on Feb. 5, 2019, now Pat. No. 12,255,974.

(Continued)

(51) Int. Cl.
*H04L 69/16* (2022.01)
*H04L 9/40* (2022.01)
(Continued)

(52) U.S. Cl.
CPC ........ *H04L 69/162* (2013.01); *H04L 63/0428* (2013.01); *H04L 69/12* (2013.01);
(Continued)

(58) Field of Classification Search
CPC . H04L 63/0428; H04L 69/164; H04L 63/105; H04L 47/2483
See application file for complete search history.

(56) References Cited

U.S. PATENT DOCUMENTS

| 7,526,577 B2 * | 4/2009 | Pinkerton | ............... H04L 69/32 |
| | | | 370/231 |
| 8,244,864 B1 | 8/2012 | Bahl et al. | |

(Continued)

FOREIGN PATENT DOCUMENTS

| CN | 104718720 B | 4/2018 |
| CN | 106921618 B | 11/2019 |

(Continued)

OTHER PUBLICATIONS

J. Iyengar, Ed. Fastly; M. Thomson, Ed. Mozilla, "QUIC: A UDP-Based Multiplexed and Secure Transport draft-ietf-quic-transport-16", IETF, 2018 (Year: 2018).*

(Continued)

*Primary Examiner* — Alex Tran
(74) *Attorney, Agent, or Firm* — Compass IP Law PC

(57) ABSTRACT

Embodiments include a method of opening a Quick User Datagram Protocol (UDP) Internet Connections (QUIC) socket on a computing platform, initializing QUIC packet processing of a hardware-based offloader, opening a QUIC connection to the offloader, and transmitting a first QUIC packet to the offloader over the QUIC connection. The hardware-based offloader encrypts and transmits the QUIC packet.

20 Claims, 15 Drawing Sheets

Related U.S. Application Data

(60) Provisional application No. 62/772,582, filed on Nov. 28, 2018.

(51) Int. Cl.

| | |
|---|---|
| *H04L 69/12* | (2022.01) |
| *H04L 69/164* | (2022.01) |
| *H04L 69/324* | (2022.01) |
| *H04L 69/326* | (2022.01) |

(52) U.S. Cl.
CPC .......... *H04L 69/164* (2013.01); *H04L 69/324* (2013.01); *H04L 69/326* (2013.01)

(56) References Cited

U.S. PATENT DOCUMENTS

| | | | |
|---|---|---|---|
| 10,182,039 | B2 | 1/2019 | Loprieno et al. |
| 10,199,989 | B2 * | 2/2019 | Seth .......................... H03F 3/30 |
| 10,785,020 | B2 * | 9/2020 | Balasubramanian ........................ H04L 63/0485 |
| 10,911,491 | B2 * | 2/2021 | Kraemer ............. H04L 63/0272 |
| 11,005,771 | B2 * | 5/2021 | Pismenny ............... H04L 69/22 |
| 11,095,758 | B2 * | 8/2021 | Masputra ............. G06F 21/606 |
| 11,115,504 | B2 | 9/2021 | Balasubramanian et al. |
| 11,184,465 | B2 | 11/2021 | Wang et al. |
| 11,336,625 | B2 | 5/2022 | Deval et al. |
| 11,483,296 | B1 | 10/2022 | Diamant et al. |
| 11,533,655 | B2 | 12/2022 | Sarker et al. |
| 11,870,759 | B2 | 1/2024 | Deval |
| 2001/0052072 | A1 | 12/2001 | Jung |
| 2004/0143734 | A1 | 7/2004 | Buer et al. |
| 2005/0195851 | A1 | 9/2005 | Banerjee et al. |
| 2006/0129676 | A1 | 6/2006 | Modi et al. |
| 2008/0042773 | A1 | 2/2008 | Koriyama |
| 2008/0304481 | A1 | 12/2008 | Gurney et al. |
| 2009/0016334 | A1 | 1/2009 | Forsberg et al. |
| 2010/0283635 | A1 | 11/2010 | Brinkman et al. |
| 2010/0325463 | A1 | 12/2010 | Lindsay |
| 2014/0258705 | A1 | 9/2014 | Roskind et al. |
| 2017/0118314 | A1 | 4/2017 | Lin et al. |
| 2017/0180329 | A1 | 6/2017 | Lin et al. |
| 2019/0044705 | A1 | 2/2019 | Deval et al. |
| 2019/0124054 | A1 * | 4/2019 | Zhang ...................... G06F 21/60 |
| 2019/0182114 | A1 | 6/2019 | Tavridis et al. |
| 2019/0199835 | A1 | 6/2019 | Deval et al. |
| 2019/0229903 | A1 | 7/2019 | Balasubramanian et al. |
| 2019/0268305 | A1 | 8/2019 | Xu et al. |
| 2020/0403919 | A1 | 12/2020 | Cui et al. |

FOREIGN PATENT DOCUMENTS

| | | |
|---|---|---|
| CN | 106656909 B | 2/2020 |
| EP | 3725057 A1 | 10/2020 |

OTHER PUBLICATIONS

J. Iyengar, M. Thomson, "QUIC: A UDP-Based Multiplexed and Secure Transport draft-ietf-quic-transport-11", IETF, 2018 (Year: 2018).*

M. Thomson, S. Turner, "Using Transport Layer Security (TLS) to Secure QUIC draft-ietf-quic-tls-10", IETF, 2018 (Year: 2018).*

Anonymous: "Crypto Offload", Chelsio Communications, XP055594894, Online: https://web.archive.org/web/20171122062421/http://www.chelsio.com:80/crypto-offload/, Nov. 2017, 2 pages.

Authors et al. Disclosed Anonymously, "Method for efficiently offloading cryptographic processing of receive traffic," IP.com Prior Art Database Technical Disclosure, 2003, IPCOM000012719D (Year: 2003).

European First Office Action, (EP Exam Report Article 94(3) EPC), for Patent Application No. 21170247.7, Mailed May 16, 2023, 7 pages.

European Office action for European patent application No. 19157598.4, dated Jul. 13, 2020 (9 pages).

Extended European search report for European patent application No. 19157598.4, dated Jun. 17, 2019 (13 pages).

Extended European Search Report for Patent Application No. 21170247.7, Mailed Jul. 16, 2021, 13 pages.

Final Office Action for U.S. Appl. No. 16/268,306, Mailed Aug. 16, 2023, 64 pages.

Final Office Action for U.S. Appl. No. 16/268,306, Mailed Jun. 10, 2022, 35 pages.

First Office Action for U.S. Appl. No. 16/268,306, Mailed Jan. 7, 2022, 27 pages.

First Office Action for U.S. Appl. No. 17/744,296, Mailed Apr. 27, 2023, 18 pages.

G. Sabin and M. Rashti, "Security offload using the SmartN IC, A programmable 10 Gbps ethernet N IC," 2015 National Aerospace and Electronics Conference (NAECON), Dayton, OH, USA, 2015, pp. 273-276, doi: 10.1109/NAECON.2015.7443082 (Year: 2015).

Hamilton, R. et al., "QUIC: A UDP-Based Secure and Reliable Transport for HTTP/2 draft-tsvwg-quic-protocol-02", Network Working Group, Jan. 2016, 37 pages.

Iyengar, Jana and Thomson, Martin, "QUIC: A UDP-Based Multiplexed and Secure Transport draft-ietf-quic-transport-08", Dec. 5, 2017, 95 pages.

Iyengar, Jana and Thomson, Martin, "QUIC: A UDP-Based Multiplexed and Secure Transport", Internet Draft, https://datatracker.ietf.org/doc/html/draft-ietf-quic-transport-08, Dec. 5, 2017, 95 pages.

Japanese and English Translation of Japanese First Office Action for Patent Application No. 2019-009999, Mailed Feb. 28, 2023, 6 pages.

Langley, Adam, et al., "The QUIC Transport Protocol: Design and Internet-Scale Deployment", SIGCOMM '17, Aug. 21-25, 2017, Los Angeles, CA, USA, 14 pages.

M. Elbeshtli, M. Dixon and T. Koziniec, "Design consideration for efficient network interface supporting the Large Receive Offload with embedded RISC," 2013 36th International Conference on Telecommunications and Signal Processing (TSP), 2013, pp. 282-289, doi: 10.1109/TSP.2013.6613937. (Year: 2013).

Notice of Allowance for U.S. Appl. No. 16/022,843, Mailed Jan. 12, 2022, 16 pages.

Notice of Allowance for U.S. Appl. No. 17/744,296, Mailed Aug. 21, 2023, 15 pages.

O. Hohlfeld et al., "Application-Agnostic Offloading of Datagram Processing," 2018 30th International Teletraffic Congress (ITC 30), 2018, pp. 46-54, doi: 10.1109/ITC30.2018.00015. (Year: 2018).

Praveen Balasubramanian, "RE: hardware offload (was: Packet number encryption)," X 1-3, INV. 8-10, 15 H04L29/06 IETF MAI 1 Archive, Feb. 9, 2018 (Feb. 9, 2018).

Second Office Action for U.S. Appl. No. 16/268,306, Mailed Jan. 30, 2023, 52 pages.

Stanwyck, Don, "Windows Networking: Offloads and Optimizations," Windows WinHEC Fall 2017 Workshop, Dec. 2017, 43 pages.

Trammell, Brian, "[QUIC] Segment offload for UDP-based protocols Re: Requirements," IETF Mail Archive, Jun. 2016, 2 pages.

Korean and English Translation of the Notice of Preliminary Rejection for Patent Application No. 10-2019-0016641, Mailed May 17, 2024, 17 pages.

First Office Action for U.S. Appl. No. 18/514,713, Mailed Sep. 30, 2024, 15 pages.

Korean and English Translation of the Second Notice of Preliminary Rejection for Patent Application No. 10-2019-0016641, Mailed Jan. 21, 2025, 4 pages.

Huston, Geoff, "A look at QUIC use", APNIC Blog: https://blog.apnic.net/2022/07/11/a-look-at-quic-use/, Jul. 2022, 9 pages.

Stack Exchange, "How does QUIC encrypt packets containing multiple CRYPTO frames?", https://networkengineering.stackexchange.com/questions/80090/how-does-quic-encrypt-packets-containing-multiple-crypto-frames, Oct. 2022, 2 pages.

(56) References Cited

OTHER PUBLICATIONS

European Second Office Action, (EP Exam Report Article 94(3) EPC), for Patent Application No. 21170247.7, Mailed Sep. 30, 2025, 5 pages.

* cited by examiner

SA TABLE ENTRY                    PN TABLE ENTRY

| DESTINATION IP ADDRESS |
|---|
| 506 |
| VLAN ID |
| 508 |
| SOURCE CONNECTION ID |
| 510 |
| DESTINATION CONNECTION ID |
| 512 |
| QUIC VERSION |
| 514 |
| KEY PHASE, PN ENCRYPTION |
| 516 |
| CRYPTO ALGORITHM |
| 518 |
| CRYPTO KEY |
| 520 |
| CRYPTO INITIALIZATION VECTOR |
| 522 |

502

504

64-BIT PACKET NUMBER

500

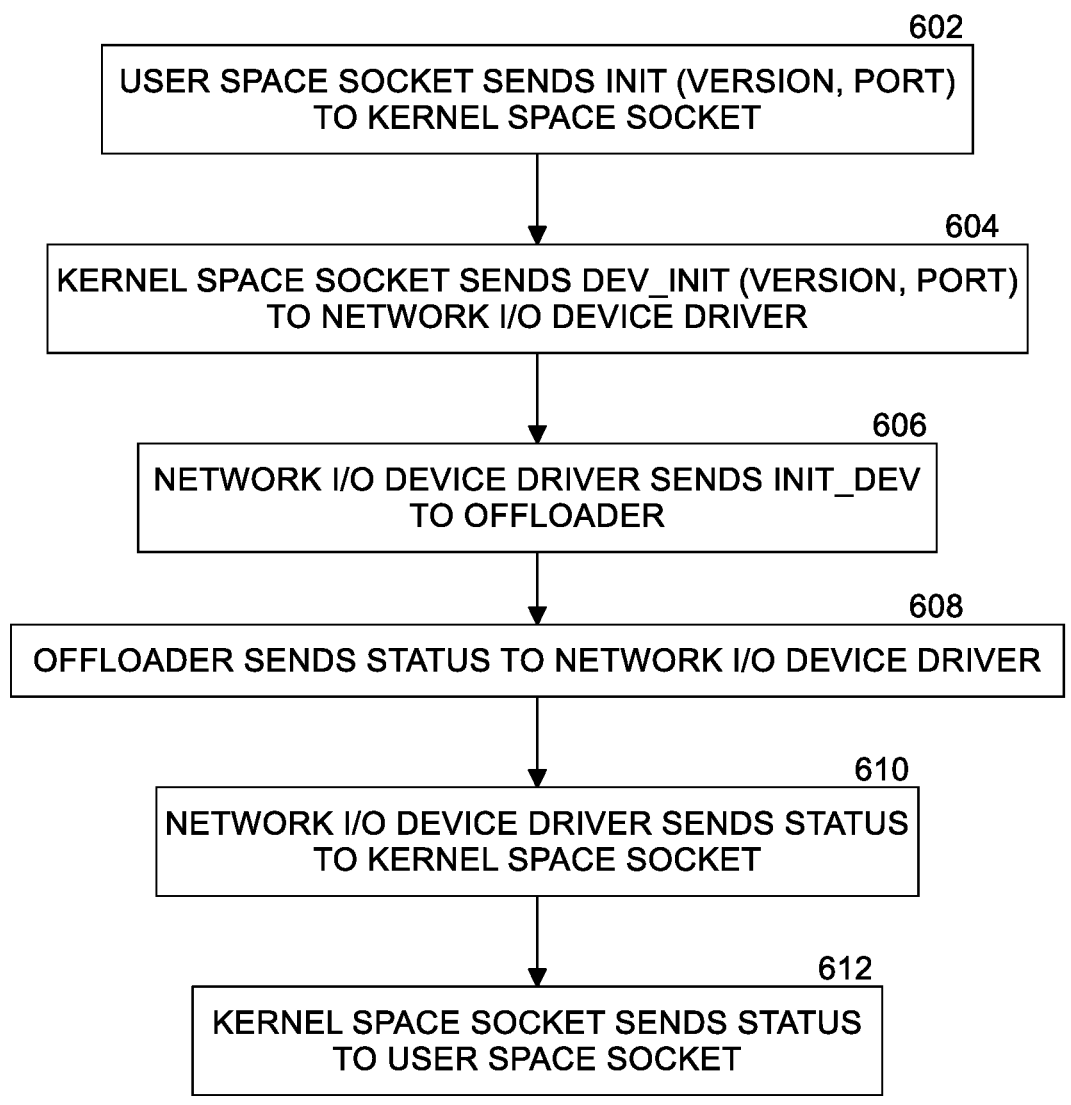

602
USER SPACE SOCKET SENDS INIT (VERSION, PORT) TO KERNEL SPACE SOCKET

604
KERNEL SPACE SOCKET SENDS DEV_INIT (VERSION, PORT) TO NETWORK I/O DEVICE DRIVER

606
NETWORK I/O DEVICE DRIVER SENDS INIT_DEV TO OFFLOADER

608
OFFLOADER SENDS STATUS TO NETWORK I/O DEVICE DRIVER

610
NETWORK I/O DEVICE DRIVER SENDS STATUS TO KERNEL SPACE SOCKET

612
KERNEL SPACE SOCKET SENDS STATUS TO USER SPACE SOCKET

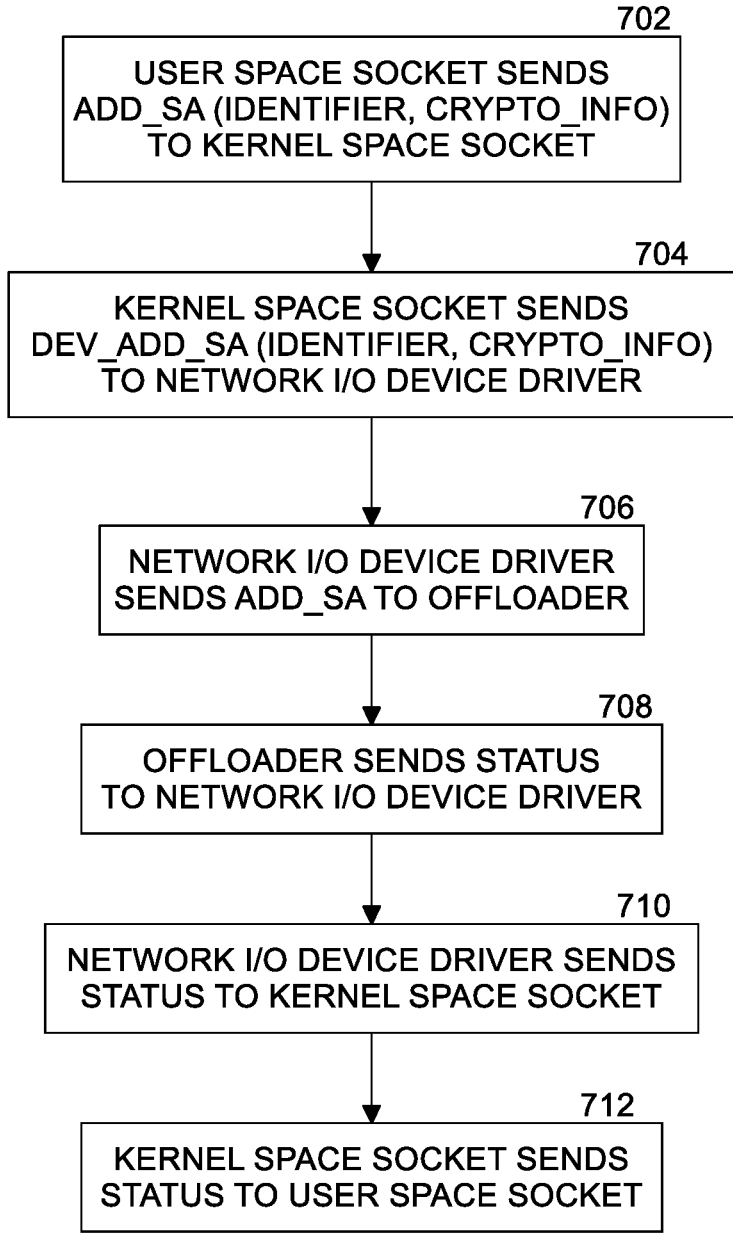

702

USER SPACE SOCKET SENDS
ADD_SA (IDENTIFIER, CRYPTO_INFO)
TO KERNEL SPACE SOCKET

704

KERNEL SPACE SOCKET SENDS
DEV_ADD_SA (IDENTIFIER, CRYPTO_INFO)
TO NETWORK I/O DEVICE DRIVER

706

NETWORK I/O DEVICE DRIVER
SENDS ADD_SA TO OFFLOADER

708

OFFLOADER SENDS STATUS
TO NETWORK I/O DEVICE DRIVER

710

NETWORK I/O DEVICE DRIVER SENDS
STATUS TO KERNEL SPACE SOCKET

712

KERNEL SPACE SOCKET SENDS
STATUS TO USER SPACE SOCKET

802
USER SPACE SOCKET SENDS
UPDATE_PN (PN
TO KERNEL SPACE SOCKET

804
KERNEL SPACE SOCKET SENDS
DEV_UPDATE_PN (PN)
TO NETWORK I/O DEVICE DRIVER

806
NETWORK I/O DEVICE DRIVER
SENDS UPDATE_PN TO OFFLOADER

808
OFFLOADER SENDS STATUS
TO NETWORK I/O DEVICE DRIVER

810
NETWORK I/O DEVICE DRIVER SENDS
STATUS TO KERNEL SPACE SOCKET

812
KERNEL SPACE SOCKET SENDS
STATUS TO USER SPACE SOCKET

800

902
QUIC SERVER OPENS QUIC SOCKET

904
QUIC SERVER CALLS INIT TO ENABLE QUIC HW OFFLOAD

906
QUIC SERVER OPENS AND CLOSES
ONE OR MORE QUIC CONNECTIONS

908
QUIC SERVER CLOSES QUIC SOCKET

900

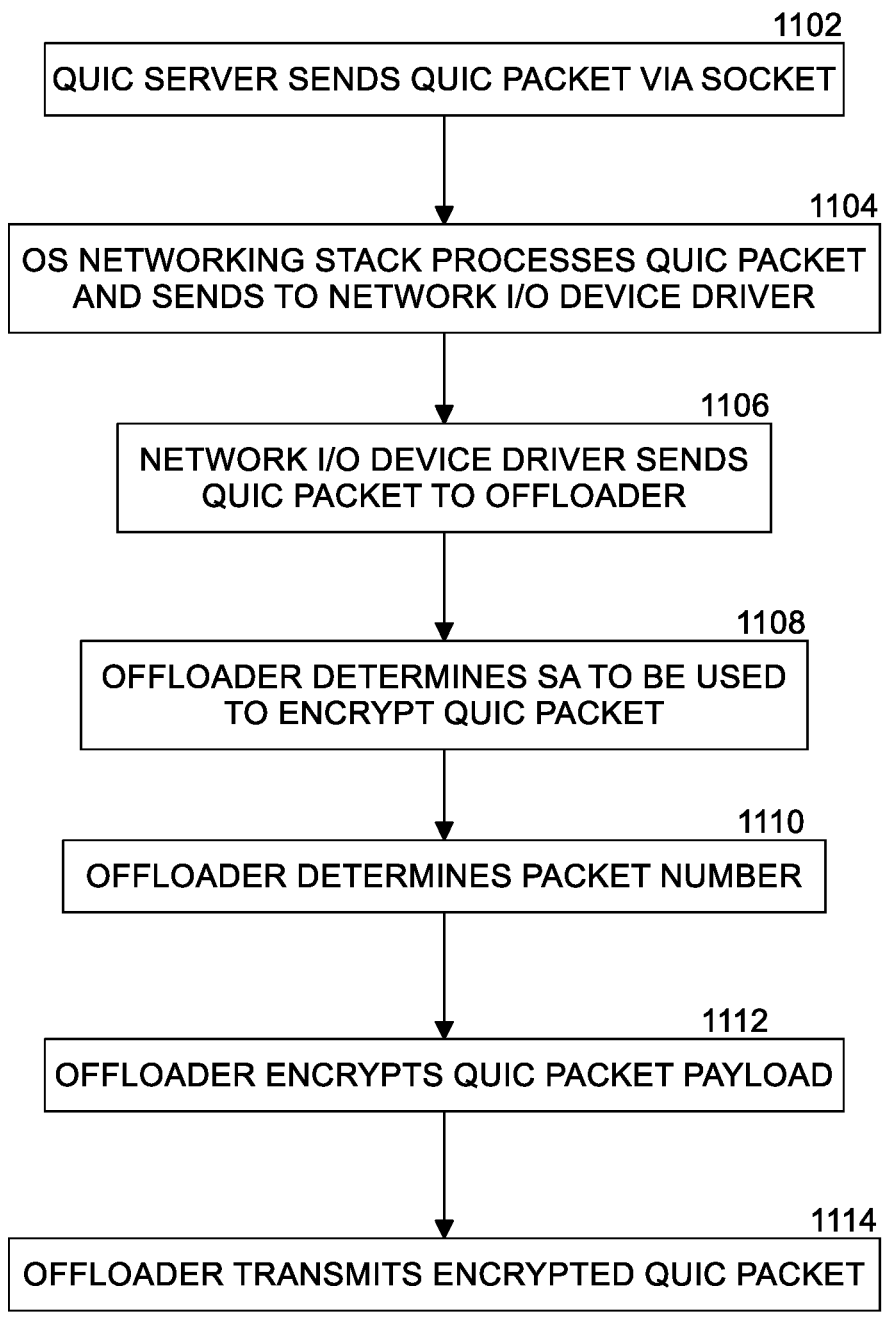

1102
QUIC SERVER SENDS QUIC PACKET VIA SOCKET

1104
OS NETWORKING STACK PROCESSES QUIC PACKET AND SENDS TO NETWORK I/O DEVICE DRIVER

1106
NETWORK I/O DEVICE DRIVER SENDS QUIC PACKET TO OFFLOADER

1108
OFFLOADER DETERMINES SA TO BE USED TO ENCRYPT QUIC PACKET

1110
OFFLOADER DETERMINES PACKET NUMBER

1112
OFFLOADER ENCRYPTS QUIC PACKET PAYLOAD

1114
OFFLOADER TRANSMITS ENCRYPTED QUIC PACKET

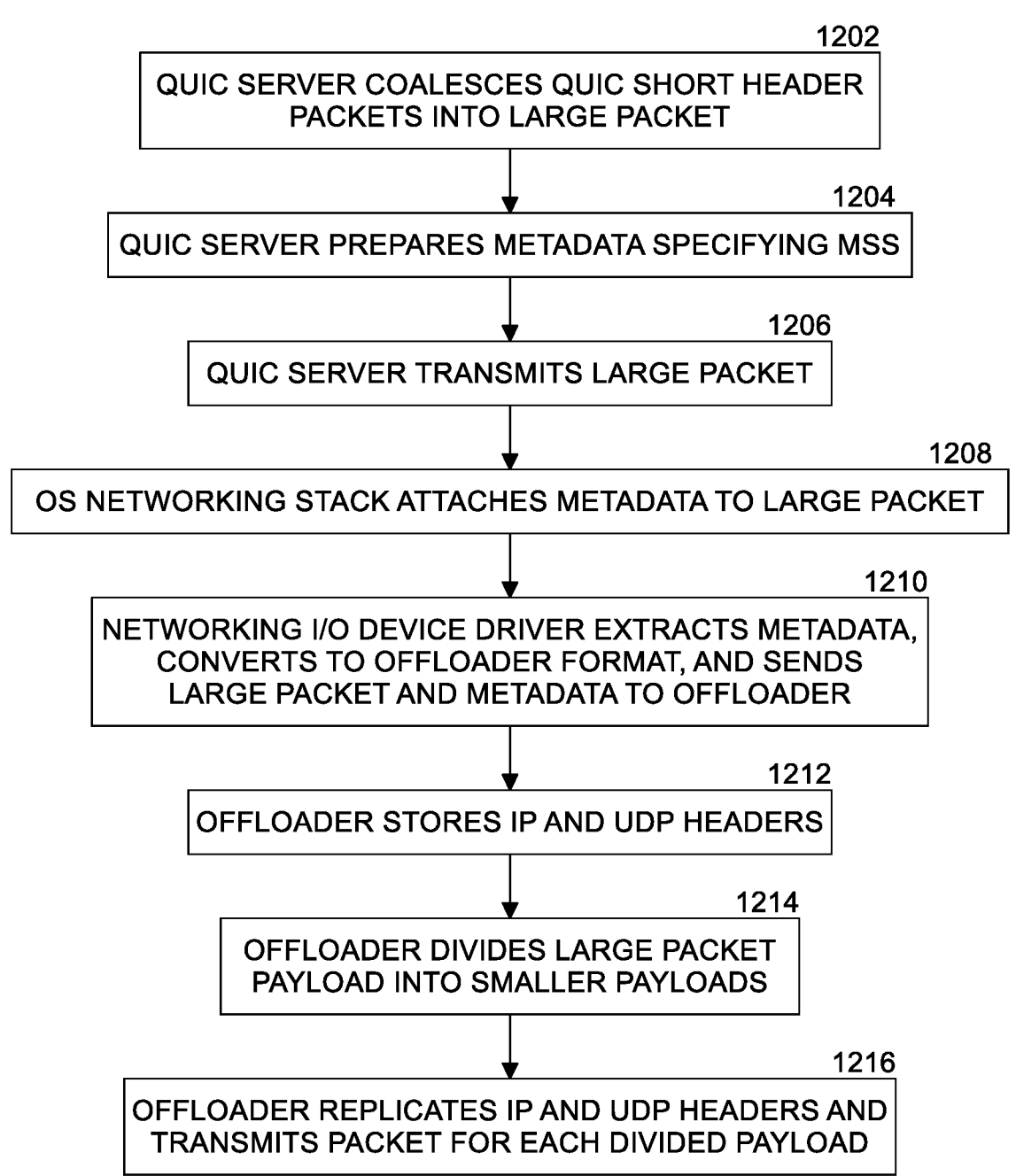

1202
QUIC SERVER COALESCES QUIC SHORT HEADER PACKETS INTO LARGE PACKET

1204
QUIC SERVER PREPARES METADATA SPECIFYING MSS

1206
QUIC SERVER TRANSMITS LARGE PACKET

1208
OS NETWORKING STACK ATTACHES METADATA TO LARGE PACKET

1210
NETWORKING I/O DEVICE DRIVER EXTRACTS METADATA, CONVERTS TO OFFLOADER FORMAT, AND SENDS LARGE PACKET AND METADATA TO OFFLOADER

1212
OFFLOADER STORES IP AND UDP HEADERS

1214
OFFLOADER DIVIDES LARGE PACKET PAYLOAD INTO SMALLER PAYLOADS

1216
OFFLOADER REPLICATES IP AND UDP HEADERS AND TRANSMITS PACKET FOR EACH DIVIDED PAYLOAD

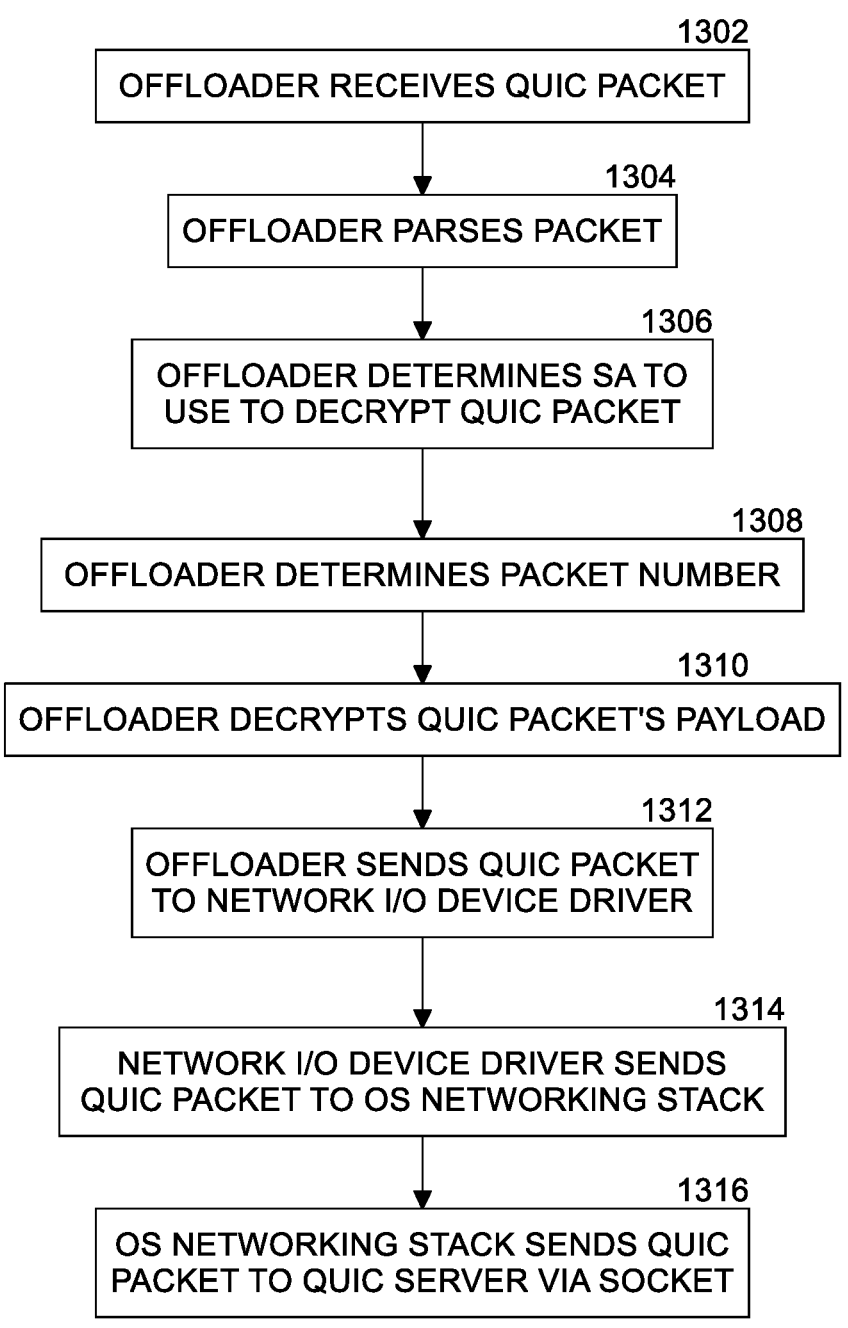

1302

OFFLOADER RECEIVES QUIC PACKET

1304

OFFLOADER PARSES PACKET

1306

OFFLOADER DETERMINES SA TO USE TO DECRYPT QUIC PACKET

1308

OFFLOADER DETERMINES PACKET NUMBER

1310

OFFLOADER DECRYPTS QUIC PACKET'S PAYLOAD

1312

OFFLOADER SENDS QUIC PACKET TO NETWORK I/O DEVICE DRIVER

1314

NETWORK I/O DEVICE DRIVER SENDS QUIC PACKET TO OS NETWORKING STACK

1316

OS NETWORKING STACK SENDS QUIC PACKET TO QUIC SERVER VIA SOCKET

STORAGE MEDIUM   1400

1402

COMPUTER EXECUTABLE
INSTRUCTIONS

FIG. 14

QUICK USER DATAGRAM PROTOCOL (UDP) INTERNET CONNECTIONS (QUIC) PACKET OFFLOADING

CROSS-REFERENCE TO RELATED APPLICATION

This application is a continuation of U.S. patent application Ser. No. 16/268,306, filed Feb. 5, 2019, which claims the benefit of U.S. Provisional Application No. 62/772,582, filed Nov. 28, 2018. The entire specifications of which are hereby incorporated herein by reference in their entirety.

COPYRIGHT NOTICE/PERMISSION

BACKGROUND

Quick User DatagramProtocol (UDP) Internet Connections (QUIC) is a transport layer network protocol used to improve performance of connection-oriented web applications that are currently using Transmission Control Protocol (TCP) See "QUIC: A UDP-Based Secure and Reliable Transport for HTTP/2", a draft Internet Engineering Task Force (IETF) protocol dated Nov. 28, 2016, QUIC establishes a number of multiplexed connections between two endpoints over the UDP. This works hand-in-hand with hypertext transport protocol (HTTP) multiplexed connections, allowing multiple streams of data to reach the endpoints independently. In contrast, HTTP hosted on TCP can be blocked if any of the multiplexed data streams has an error. QUIC seeks to reduce connection and transport latency and estimate bandwidth in each direction to avoid congestion. It also moves control of congestion avoidance processes into the application space at both endpoints, rather than in the kernel space. Additionally, the QUIC protocol can be extended with forward error correction (FEC) to further improve performance when errors are expected.

BRIEF DESCRIPTION OF THE DRAWINGS

FIG. 6 is a flow diagram of an example QUIC offload initialization.

FIG. 7 is a flow diagram of an example QUIC offload add security association operation.

FIG. 11 is a flow diagram of example packet transmission processing.

FIG. 12 is a flow diagram of example packet segmentation processing.

FIG. 13 is a flow diagram of example packet reception processing.

FIG. 14 illustrates an example of a storage medium.

DETAILED DESCRIPTION

Figure 1:
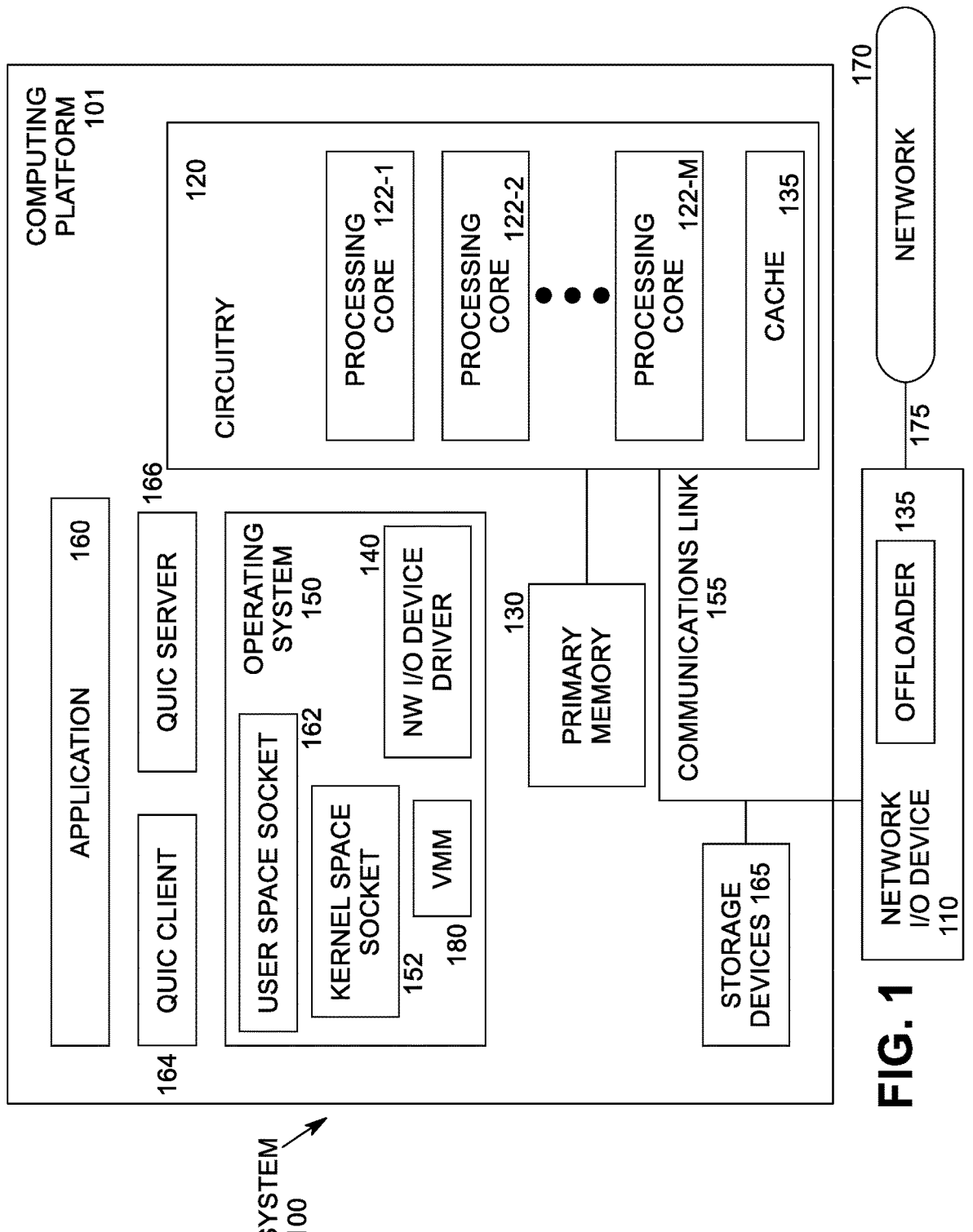
FIG. 1 illustrates an example computing system.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through network I/O device 110 (e.g., a network interface controller (NIC)) having one or more ports connected or coupled to network communication channel 175. In an embodiment, network communication channel 175 includes a PHY device (not shown). In an embodiment, network I/O device 110 is an Ethernet NIC. Network I/O device 110 transmits data packets from computing platform 101 over network 170 to other destinations and receives data packets from other destinations for forwarding to computing platform 101. In some embodiments, network I/O device 110 may be integral with computing platform 101. In an embodiment with a "SmartNIC" concept, where the NIC has central processing unit (CPU) cores onboard, the QUIC and networking stacks could run on the NIC.

According to some examples, computing platform 101, as shown in FIG. 1, includes circuitry 120, primary memory 130, network (NW) I/O device driver 140, operating system (OS) 150, at least one application 160, QUIC client 164, QUIC server 166, and one or more storage devices 165. In one embodiment, OS 150 is Linux™. In another embodiment, OS 150 is Windows® Server. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, QUIC client 164, QUIC server 166, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-m, where "m" is any positive whole integer greater than 2. In an embodiment, OS 150, NW I/O device driver 140, QUIC client 164, QUIC server 166, and application 160 are implemented as software executed by one or more processing cores 122-1 to 122-m.

In an embodiment, computing platform 101 includes one or more QUIC client(s) 164 and/or one or more QUIC server(s) 166 supporting communications using the QUIC protocol. In an embodiment, QUIC server 166 is a QUIC software stack accepting connections from another QUIC software stack (e.g., QUIC client 164). The stack initiating the connection is the client, the stack accepting the connection is the server, for that connection. In an embodiment, the QUIC software stack may be implemented as part of application 160 in user space that opens a socket, or the QUIC software stack may be implemented as a kernel mode component accessible by applications through a socket. Thus, QUIC client 164 and QUIC server 166 may be implemented in application 160, in OS 150, or as separate components, depending on the embodiment. In an embodiment, QUIC client 164 and/or QUIC server 166 is coupled to user space socket 162, which is coupled to kernel space socket 152 in OS 150. In embodiments disclosed herein, the user space QUIC stack is described, but in various embodiments processing of packets may be offloaded from computing platform 101.

In an embodiment, network I/O device 110 includes offloader circuitry 135 to offload processing of packets from software components in computing platform 101 such as application 160, QUIC client 164, QUIC server 166, network I/O device driver 140, and/or OS 150. In an embodiment, offloader 135 includes a field programmable gate array (FPGA) (not shown in FIG. 1), providing encryption/decryption and segmentation processing of offloaded packets through a defined interface. The interface allows separating the packet processing offload from connection state tracking. In another embodiment, offloader circuitry 135 includes one or more application specific integrated circuits (ASICs). In another embodiment, offloader circuitry 135 includes hard-wired logic.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Current QUIC implementations in software do not support any hardware offloads. No hardware offload interfaces exist because all QUIC processing to date is done in software. Analysis of the QUIC protocol stack shows that there are several bottlenecks in cryptographic and UDP processing in the networking stack. Although some existing implementations use advanced encryption standard (AES) new instructions (AESNI) in the processor to increase cryptographic processing performance, an estimated cost for supporting the QUIC protocol in software is 2.5 times the cost of supporting an equivalent legacy protocol like TCP.

Embodiments of the present invention include a method to offload QUIC packet encryption/decryption and segmentation processing from QUIC client 164 and/or QUIC server 166 to offloader hardware 135 with minimal changes to host software (e.g., application 160, network I/O device driver 140, and/or OS 150). A QUIC software stack running in an operating system (OS) can communicate with offloader hardware 135 (e.g., a FPGA).

Embodiments used herein to optimize QUIC operations may be applied to other transport protocols such as Real-time Transfer Protocol (RTP) and TCP. Embodiments can also apply to other cryptographic protocols such as Transport Layer Security (TLS), Datagram Transport Layer Security (DTLS) and Internet Protocol Security (IPsec). Crypto and segmentation offloads in QUIC can reduce processor usage and improve network scaling. This leads to reduced deployment costs.

Figure 2:
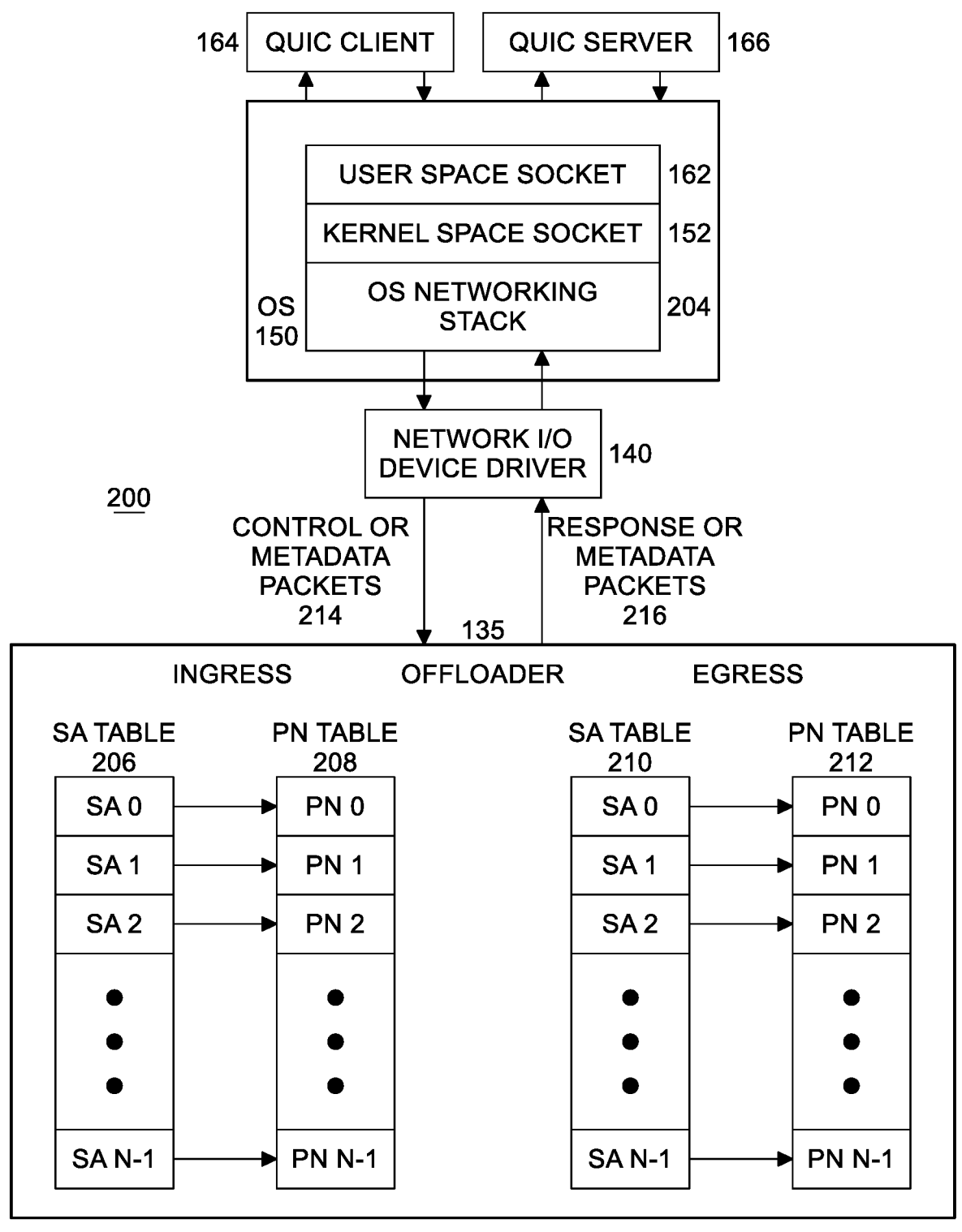
FIG. 2 illustrates an example arrangement of a QUIC offload.

FIG. 2 illustrates an example arrangement of a QUIC offload. The QUIC offloads described herein require offloader hardware 135, such as application specific integrated circuits (ASICs), sequestered cores or FPGAs. They expose a QUIC offload interface that can be managed by a software driver with an associated OS and protocol stack.

A requirement for processing received packet offloads is that offloader 135 can recognize received QUIC packets. Offloader 135 includes the ability to parse packet headers, and via runtime configuration, recognize QUIC packets. For example, Offloader 135 may recognize QUIC packets as UDP packets with specific destination ports, where the port numbers are supplied by network I/O device driver 140. Conversely, offloading the transmit function requires the offloader to parse headers, identify the QUIC packets, and identify and compute the cryptographic parameters for the offloader to encrypt the packets. The transmit pipeline may also offload other optimizations like transmit segmentation. The offloader may further be programmed to have the offloads work independently or together.

In an embodiment, QUIC server 166 connects to the QUIC capability using a file descriptor to access the software stack (162, 152, 204) in OS 150. Host software such as QUIC client 164 and/or QUIC server 166 configures QUIC offloader hardware 135 by sending commands with command data. The offloader sends back the status of the command to the network I/O device driver 140 for additional handling. Offloader 135 may provide registers, a command queue, or recognize special Ethernet packets to configure the offload.

OS 150 includes user space socket 162 to interface in user mode with QUIC client 164 and/or QUIC server 166. User space socket 162 connects to kernel space socket 152, which is in kernel mode. OS networking stack 204 is also in kernel mode. OS networking stack 204 includes one or more layers of software to handle various networking communications protocols (e.g., TCP/IP, UDP, etc.) as is well known. Network I/O device driver 140 is designed specific to network I/O device 110 to communicate packets, commands, and status. In an embodiment, network I/O device driver 140 sends control messages and/or metadata packets 214 to offloader 135 within network I/O device 110. Offloader 135 returns response messages and/or metadata packets 216 to network I/O driver 140. In an embodiment, network I/O device driver 140 is part of OS 150. An alternative embodiment may provide access to the network I/O device from user space, where user space software may implement the QUIC server all the way down to the I/O driver.

Offloader 135 includes at least four tables, two for ingress and two for egress. On the ingress side, offloader 135 includes a first security association (SA) table 206. SA table 206 includes a plurality of entries (up to a maximum size n, where n is a natural number), each entry storing a SA. In an embodiment, a SA includes a negotiated cryptographic key used by offloader 135 for encrypting and/or decrypting packets. Offloader also includes a first packet number (PN) table 208, with each entry in SA table 206 being associated with an entry in PN table 208. PN Table 208 includes a plurality of entries (up to a maximum size n, where n is a natural number), each entry storing a PN. In an embodiment, the number of entries in SA table 206 is the same as the number of entries in PN table 208. On the egress side, offloader 135 includes a second SA table 210, and a second PN table 212. In an embodiment, the number of entries in SA table 210 is the same as the number of entries in PN table 212. In an embodiment, offloader 135 encrypts and/or decrypts packet data using a selected SA table entry and associated PN table entry.

In FIG. 2, the SA Tables 206, 210 are shown as being split into ingress and egress tables, but the SA tables could also be combined into one table with a bit to indicate direction of packet flow. In FIG. 2, the PN Table is shown separate from the SA Table, but in other embodiments they could be combined.

In various embodiments, multiple methods may be used to pass metadata between software (e.g., application 160, QUIC client 164, QUIC server 166, and OS 150) and hardware (e.g., network I/O device 110). Two methods are described herein, one using fields in descriptors (e.g., an out-of-band method) and the other passing metadata within Ethernet packets (e.g., an in-line method). On transmit (Tx), network I/O device driver 140 marks data packets for offload by writing Tx descriptor fields or by adding metadata to transmitted packets. Descriptors point to packet data, including packet headers, and contain metadata pertaining to those packets.

On receive (Rx), offloader 135 indicates both successful offloading of a packet, and a failure to offload a packet, by writing Rx descriptor fields in packet headers or adding metadata to receive packets that have been or should have been offloaded.

In the example implementation discussed herein, a media access control (MAC) component in network I/O device 110 is paired with an offloader implemented as an FPGA. In an embodiment, an image supporting QUIC encryption and decryption, plus transmit segmentation, is programmed into the FPGA. In an embodiment, host software (e.g., QUIC client 164, QUIC server 166, OS 150, OS networking stack 204, and network I/O driver 140) and FPGA communicate using the in-line method, by sending commands, results and metadata via Ethernet L2 tags indicated by special L2 Ethertypes. Control and result data are stored in the Ethernet packet payload.

The following commands provide an example set that implement the requirements set forth in the sections below.

TABLE 1

| Sample QUIC hardware interface commands | |
| --- | --- |
| Init Device | Initialize hardware and set global configuration. |
| Get Capabilities | Return hardware QUIC offload capabilities. |
| Set UDP Port | Set the UDP port assigned to QUIC traffic. |
| Add SA | Add Security Association when for a QUIC connection. |
| Delete SA | Remove a Security Association. |
| Update SA | Update dynamic SA information, such as the full QUIC packet number. |

Various embodiments could support more commands or combine some of the above commands.

In some circumstances it may not be feasible to offload the entire QUIC protocol to offloader hardware 135. The offloader and host software (e.g., QUIC client 164 and/or QUIC server 166) must agree on which packets will be offloaded.

Since different QUIC versions may use different handshakes for starting connections and generating keys, the handshake is left in the OS networking stack 204. A few Long Headers packets are exchanged to establish a connection and are handled completely in host software (e.g., OS 150). The offloader hardware only offloads QUIC Short Header packets, which carry the vast majority of QUIC traffic.

Furthermore, offloader 135 may pass some received Short Header packets through to host software for processing. Offloader 135 indicates the decryption and authentication status in out-of-band data so the host software knows to process passed-through packets.

Recognizing QUIC Packets: Offloader 135 must be configured to properly recognize received QUIC packets. The QUIC UDP port is programmed into the offloader so the offloader's network packet parser can correctly identify QUIC packets based on the UDP header.

Figure 3:
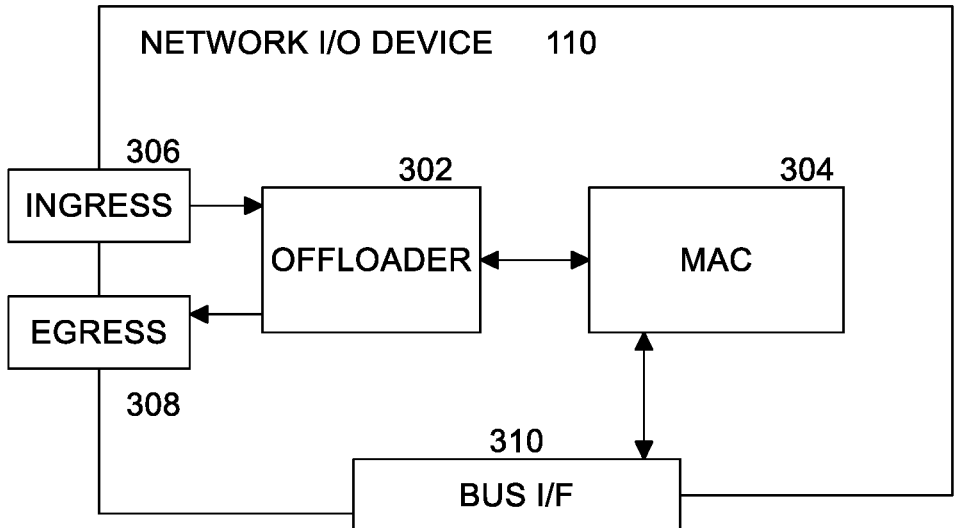
FIG. 3 illustrates an example network I/O device.

FIG. 3 illustrates an example network I/O device. In an embodiment, network I/O device 110 includes ingress 306 and egress 308 ports for receiving data from a network 170 and transmitting data to a network 170, respectively. Network I/O device 110 include bus interface (UF) circuitry 310 to communicate with computing platform 101. In an embodiment, bus OF 310 communicates over a PCIe bus. Network I/O device 110 includes media access control (MAC) circuitry 304 coupled to bus OF 310. In an embodiment, network I/O device 110 includes offloader 135 to communicate with ingress port 306, egress port 308, and MAC 304 to process the QUIC protocol.

Figure 4:
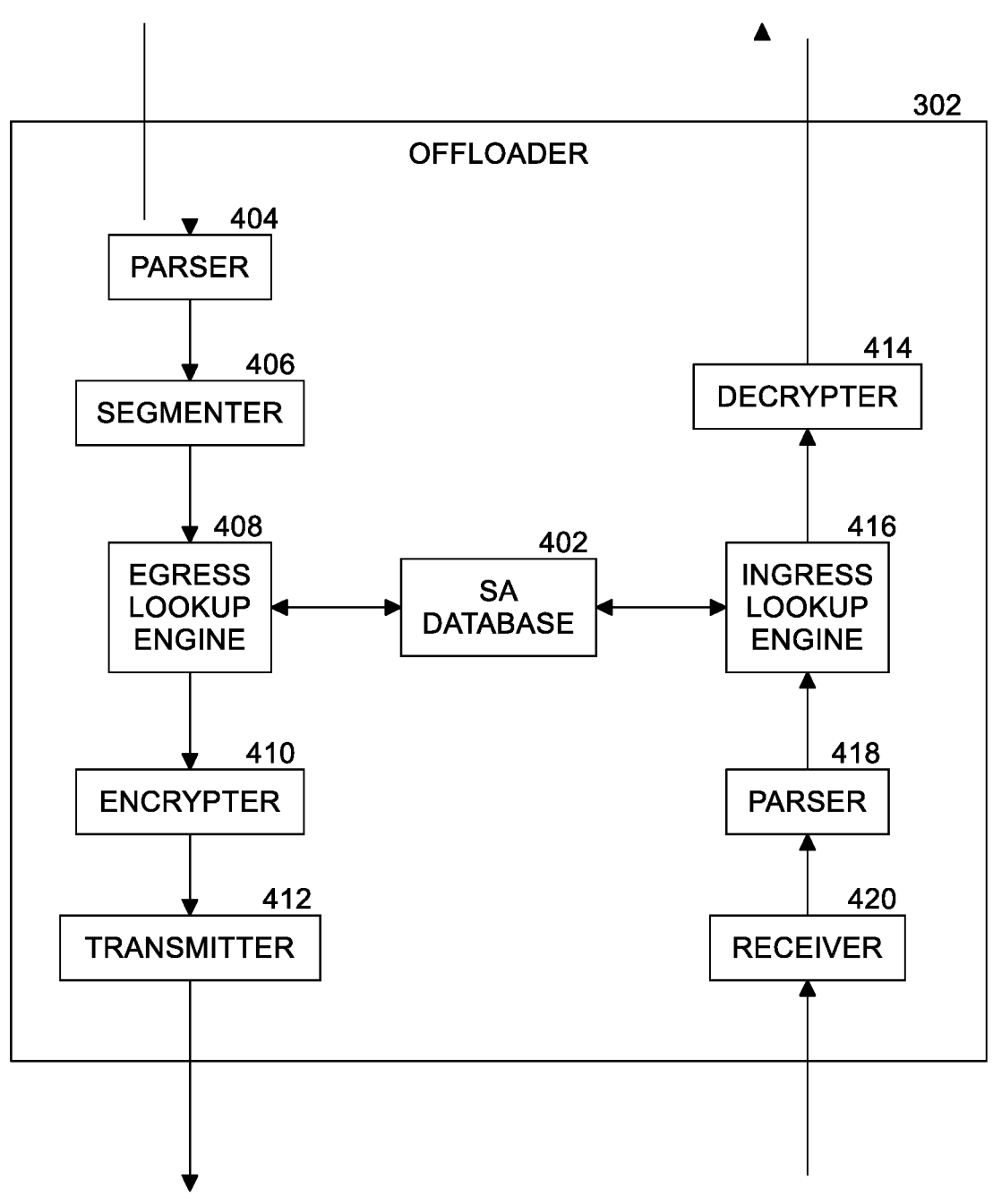
FIG. 4 illustrates an example offloader.

FIG. 4 illustrates an example offloader. For transmit (Tx) operations, packets are received from the host via bus OF 310 by parser 404 in offloader 302. Parser 404 recognizes the packet as a QUIC packet and creates relevant metadata. If the packet is too large to transmit to the network, and segmentation information exists, the segmenter 406 segments the packet into smaller packets that may be transmitted. In some implementations, segmenter 406 may optionally use metadata from parser 404. Whether segmented or not, the packets will be described as segmented in the subsequent steps. Egress lookup engine 408 uses metadata from the parser, and operating on the already segmented QUIC packets, fetches encryption information such as keys and nonces from SA Database 402. Encrypter 410 encrypts the segmented packets using the information from SA Database 402. Transmitter 412 transmits the encrypted QUIC packets over egress 308 to the network.

For receive (Rx) operations, receiver 420 receives the encrypted QUIC packet from the network via ingress 306. Parser 418 recognizes the packet as a QUIC packet and creates relevant metadata. Ingress lookup engine 416 uses metadata from parser 418 to fetch decryption information such as keys and nonces from SA Database 402. Decrypter 414 decrypts the packet using the information from SA Database 402. Packets are delivered using bus OF 310 to the host.

Security Association (SA) Database: Host software configures offloader 135 with two SAs per QUIC connection, one each for egress and ingress. The SA entries contain information to match the connection and the connection's cryptographic parameters. In an embodiment, SA tables 206, 210 are match action tables. The match characteristics can be flexibly configured to use combinations of Destination IP Address, virtual local area network (VLAN) identifier (ID), Source Connection ID, Destination Connection ID and Key Phase.

Figure 5:
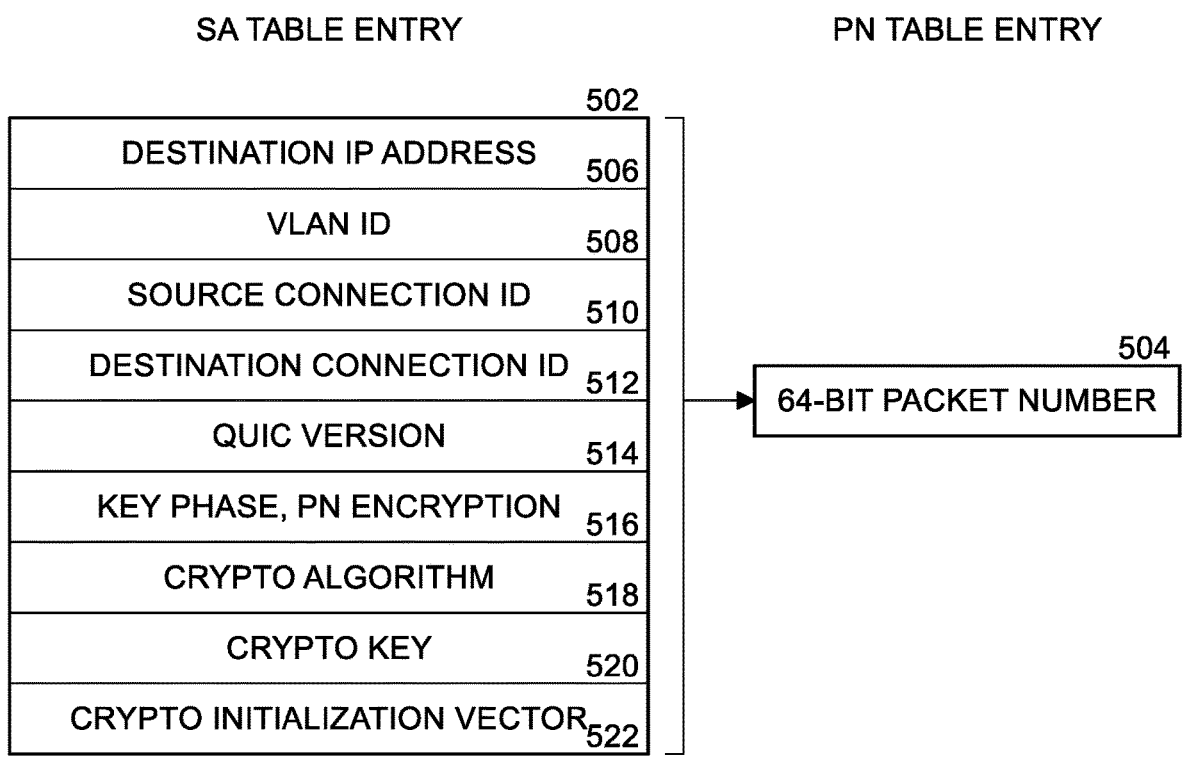
FIG. 5 illustrates an example security association (SA) table entry and packet number (PN) table entry.

FIG. 5 illustrates an example 500 security association (SA) table entry 502 and an associated packet number (PN) table entry 504. In an embodiment, SA table entry 502 represents one of the entries in SA table 206 or SA table 210, and PN table entry 504 represents one of the entries in PN table 208 or PN table 212.

Destination Internet Protocol (IP) address 506 and virtual local area network (VLAN) ID 508 may sort connections into different domains, like virtual machines (VMs) or containers, which allows the offloader to handle duplicate Connection IDs (e.g., source Connection ID 510, Destination Connection ID 512) in cases where multiple QUIC stacks are active. The offloader could make the pragmatic choice to support only Connection IDs and Key Phase, not allowing conflicting Connection IDs to be offloaded. When offloading multiple domains with this limited match criteria, the likelihood of duplicates will depend on QUIC stack implementation choices.

The QUIC Version field 514 indicates which QUIC version has been negotiated for the connection. The offloader may use this information to adjust its processing of the QUIC protocol or cause an Add SA command to fail if offloader 135 does not support the specified QUIC version. The Key Phase flag 516 indicates which key phase the SA applies to. QUIC connections may change a key phase, which requires a different set of SA information. This flag (e.g., a bit) allows the offloader to switch to the next SA or start passing packets through unprocessed until host software updates the SA with the new key. The Packet Number Encryption (PNE) flag 516 indicates that the offloader shall perform PNE on the connection.

Post-match, the offloader fetches the encryption/decryption cryptographic key 520, cryptographic Initialization Vector (IV) 522, and packet number information 504 so the offloader can construct the full packet number, to combine with the IV to form a nonce and encrypt/decrypt the packet being processed.

Packet Number Update: In the QUIC protocol's current form, QUIC packet numbers are used in constructing the cryptographic nonce. Since QUIC packet headers only contain a portion of the packet number, the offloader is programmed periodically with a full packet number, which is stored per SA. The match action table mentioned above (e.g., one of the SA tables) fetches the full packet number, along with the key and IV, to perform encryption/decryption. The offloader uses the full packet number to determine the high bytes of the packet number from the packet before performing the encryption/decryption. Note that the packet number field must always be up-to-date for an otherwise valid SA, to prevent the offloader from attempting encryption or decryption with an invalid nonce. This means the Add SA operation must be performed atomically; a valid bit must be set at the end of the add process or the packet number must be updated before the SA is added.

As discussed herein, in an embodiment the initial packet number is an example of a seed value that is used to infer the sequence of unique nonces. In other applications of this concept, the packet number could be replaced by the equivalent seed value.

Flexible Nonce Interface: To simplify the offloader implementation, host software could pass the nonce as metadata per packet to offloader 135. This would remove the requirement to update and store the full packet number in the offloader, and for the offloader to extract the packet number from packets on egress. However, this approach has a limitation, in that it would only work for egress traffic, and so would be best suited for an offloader targeting a video-streaming server model.

Ingress Decryption Status: The offloader passes decryption and authentication status 216 to the host software. If the host software is network I/O device driver 140, the driver may interpret this information, convert the information to a network stack format and pass the data to the upper protocol layers (e.g., OS networking stack 204) via a software interface.

Transmit Segmentation: Transmit Segmentation Offload (TSO) improves performance by reducing the number of packets traversing the network stack, saving per-packet overhead. Two forms of TSO are possible. TSO may be implemented by enabling the QUIC stack (e.g., software layers 164, 166, 162, 152, and 204) to pre-segment QUIC frames into maximum segment sized (MSS) sections across one or more buffers. Host software programs the offloader with a scatter gather list and maximum segment size (MSS) per outgoing packet; the MSS may be passed using metadata. The offloader then replicates the IP and UDP header, while segmenting the QUIC payload into MSS-sized chunks for transmission.

The QUIC protocol describes various types of QUIC frames to implement the protocol. Data is transmitted via stream frames. When combined with encryption offload, a segmentation offload that understands the QUIC protocol may further improve performance by allowing the QUIC stack (e.g., software layers 164, 166, 162, 152, and 204) to send large QUIC stream frames all the way down the stack to offloader 135, where the offloader will replicate the stream header, in addition to the IP and UDP header. In order for the offloader to segment a QUIC packet, the offloader must be told the maximum segment size per outgoing packet. This is passed to the offloader via the transmit metadata mentioned above.

In an embodiment, the host software interface defines a new set of QUIC-specific socket options for a UDP socket; these socket options call hooks in network I/O device driver 140 to communicate with offloader 135, which will in turn send control packets 214 with commands to the offloader. Most QUIC stacks are currently implemented in user space, so they open UDP sockets like any other network-aware application. In an embodiment, the lower parts of the interface could also support a kernel QUIC stack.

In an embodiment, the QUIC stack (e.g., software layers 164, 166, 162, 152, and 204) first enables the QUIC interface on the socket by calling setsockopt with SOL_UDP and UDP_ULP options, thus enabling the newly defined QUIC upper layer protocol. Unlike normal UDP sockets, because encryption/decryption will be performed on a specific device (e.g., network I/O device 110), in an embodiment the QUIC stack then calls setsockopt with SO_BINDTODEVICE. This call checks that the network I/O device supports the QUIC offload and returns failure if the network I/O device does not support the QUIC offload. The QUIC stack may then attempt to bind to a different device or close the socket.

Various new socket options are defined that correspond to the commands sent to offloader 135. These options include:
 1) Fetching offloader hardware capabilities—host software receives the following: a) supported QUIC versions and global versus per SA capability; b) number of SAs; c) supported match criteria (Connection IDs, VLANs, IP addresses); and d) support for Packet Number Encryption.
 2) Initializing the device—program the offloader hardware with the UDP QUIC port and QUIC version. This will fail if the device does not support the version of QUIC offload attempting to be offloaded.
 3) Adding a Security Association (SA)—pass SA lookup information and cryptographic parameters to kernel space for forwarding to offloader hardware 135 by network I/O device driver 140; each socket can have multiple SAs, so the socket maintains a list of the SAs based on a hash of the connection ID.
 4) Deleting a SA—pass SA lookup info to the network I/O device driver 140 to be forwarded to offloader hardware 135 in a Delete SA command.
 5) Updating the QUIC packet number—periodically update the full packet number so the offloader can create the correct nonce for encryption/decryption.

In an embodiment, these socket options ultimately call functions that hook into the network I/O device driver 140 through a device operations structure registered with the network interface structure. These function hooks are registered with the network interface when the driver first loads and indicates the driver supports QUIC offload.

In an example Linux implementation, the following device operations structure is defined for function callbacks that map to each of the above commands.

© 2018 Intel Corporation
```
struct quicdev_ops {
    int (*quic_get_capabilities)(struct net_device *netdev,
                    struct quic_offload_caps *caps);
    int (*quic_init_dev)(struct net_device *netdev, u32 quic_port);
    int (*quic_add_sa)(struct net_device *netdev,
            struct quic_sa_context *sa,
            struct quic_crypto_info *crypto_info,
            u64 initial_pn);
    int (*quic_update_pn)(struct net_device *netdev,
                struct quic_sa_context *sa,
                u64 new_pn);
```

10

-continued
```
    int (*quic_del_sa)(struct net_device *netdev,
            struct quic_sa_context *sa);
    int (*quic_offload_ok)(struct net_device *netdev);
};
```

In an embodiment, each of these operations is called from either a getsockopt or setsockopt call from the QUIC stack (e.g., software layers 164, 166, 162, 152, and 204). For example,

```
setsockopt(socketfd,SOL_QUIC,ADD_QUIC_TX,sa,
        sizeof(struct quic_add_sa));
``` goes through the socket application programming interface (API), with all of the cryptographics parameters, and eventually results in a call to quic_add_sa in the network I/O driver 140.

In an embodiment, the quic_offload_ok hook is called with getsockopt periodically to get the state of the offloader hardware, for example to check if a reset occurred, to decide whether or not the offloaded SAs should be removed, reprogrammed, etc.

Ingress Metadata: As discussed above, offloader hardware 135 passes back the decryption status 216 for ingress QUIC packets to the network I/O device driver 140. The driver parses this information and then passes the information to the upper protocol layers (e.g., OS networking stack 204) via a private variable field in the packet structure. Finally, this is communicated to the user-space stack via an out-of-band data channel in the socket API.

Transmit Segmentation: As discussed above, the maximum segment size (MSS) is passed per packet from OS networking stack 204 to tell offloader 135 how large each segment is. The segment size is sent to the network I/O device driver 140 as out-of-band data with each packet. The network I/O driver then places this segment size in the Tx metadata.

If the offloader supports one MSS per transmit segmentation operation (TSO), then packets may need to be padded to make them fit the uniform MSS. Padding is required to fill the end of a packet where a QUIC frame would be split across two outgoing packets. If the offloader takes MSS per outgoing packet, no padding is required.

Flexible Egress Interface: As discussed above, the interface should support a flexible nonce that could change with the QUIC specification as the specification evolves over time. This is achieved by using the out-of-band data channel in the socket API to send the nonce with each Tx packet. The kernel stack will extract the nonce from the out-of-band data and send the nonce with the packet structure via the private variable field. The network I/O device driver must parse this and send the nonce to the offloader as metadata.

In an example Linux implementation, control message (CMSG) headers are used to pass out-of-band control data to the driver along with the QUIC packet. The following example interface allows the caller to create an array of QUIC payloads along with an array of nonces corresponding to each packet. This reduces the number of system calls for sending multiple packets.

```
int send_quic_packets(int socketfd, struct quic_header *quichdr, char **data, char
  **nonces, int numpackets)
{
    struct msghdr msg = {0};
  struct cmsghdr *cmsg;
  char *control;
  struct iovec *msg_iov;
  int rc;
        int cmsg_len = CMSG_SPACE(sizeof(*quic_hdr) +
        (CMSG_SPACE(QUIC_AES_GCM_IV_BYTES) * numpackets);
  control = malloc(cmsg_len);
  if (!control) {
      printf("failed to allocate cmsg headers\n");
      return -1;
  }
  msg.msg_control = control;
  msg.msg_controllen = cmsg_len
  // First CMSG header is QUIC header each packet will use
cmsg = CMSG_FIRSTHDR(&msg);
        cmsg->cmsg_level = SOL_QUIC;
  cmsg->cmsg_type = QUIC_SET_HEADER;
  cmsg->cmsg_len = CMSG_LEN(sizeof(*quichdr));
  memcpy(CMSG_DATA(cmsg), quichdr, sizeof(*quichdr));
        for (i = 0; i < numpackets; i++) {
          // add each NONCE as cmsg header
          cmsg = CMSG_NXTHDR(&msg, cmsg);
          cmsg->cmsg_level = SOL_QUIC;
          cmsg->cmsg_type = QUIC_SET_NONCE;
          cmsg->cmsg_len = CMSG_LEN(QUIC_AES_GCM_IV_BYTES);
          memset(CMSG_DATA(cmsg), nonces[i],
             QUIC_AES_GCM_IV_BYTES);
          // add payload contents to msg
          msg_iov[i].iov_base = data[i];
          msg_iov[i].iov_len = sizeof(data[i]);
        }
  msg.msg_iov = msg_iov;
  msg.msg_iovlen = numpackets;
  rc = sendmsg(socketfd, &msg, 0);
}
```

35

FIG. 6 is a flow diagram of an example QUIC offload initialization. The steps of FIG. 6 are performed to initialize a socket. At block 602, user space socket 162 sends an initialization command (INIT) including a version and a port to a kernel space socket 152. At block 604, kernel space socket 152 sends a device initialization command (INIT_DEV) with the version and port to network I/O device driver 140. At block 606, network I/O device driver 140 sends the INIT_DEV command 214 to offloader 135. Offloader 135 initializes a connection for the selected port. In an embodiment, the INIT_DEV commands adds the selected UDP port to the packet parser so that the offloader can quickly identify QUIC packets. At block 608, offloader 135 sends a status 216 of the INIT_DEV request back to network I/O device driver 140. At block 610, network I/O device driver 140 sends the status back to kernel space socket 152. At block 612, kernel space socket 152 sends the status back to user space socket 162.

FIG. 7 is a flow diagram of an example QUIC offload add security association operation. The steps of FIG. 6 are performed for each connection of a socket. At block 702, user space socket 162 sends an add SA command (ADD_SA) including an identifier and cryptographic information to a kernel space socket 152. At block 704, kernel space socket 152 sends a device add SA command (DEV ADD SA) with the identifier and cryptographic information to network I/O device driver 140. At block 706, network I/O device driver 140 sends the ADD_SA command 214 to offloader 135. Offloader 135 adds the identifier to an entry in SA table 206 (ingress) or SA table 210 (egress). At block 708, offloader 135 sends a status 216 of the ADD_SA request back to network I/O device driver 140. At block 710, network I/O device driver 140 sends the status back to kernel space socket 152. At block 712, kernel space socket sends the status back to user space socket 162. In an embodiment, the UPDATE_PN is performed such that the SA is not used with an invalid packet number.

Figure 8:
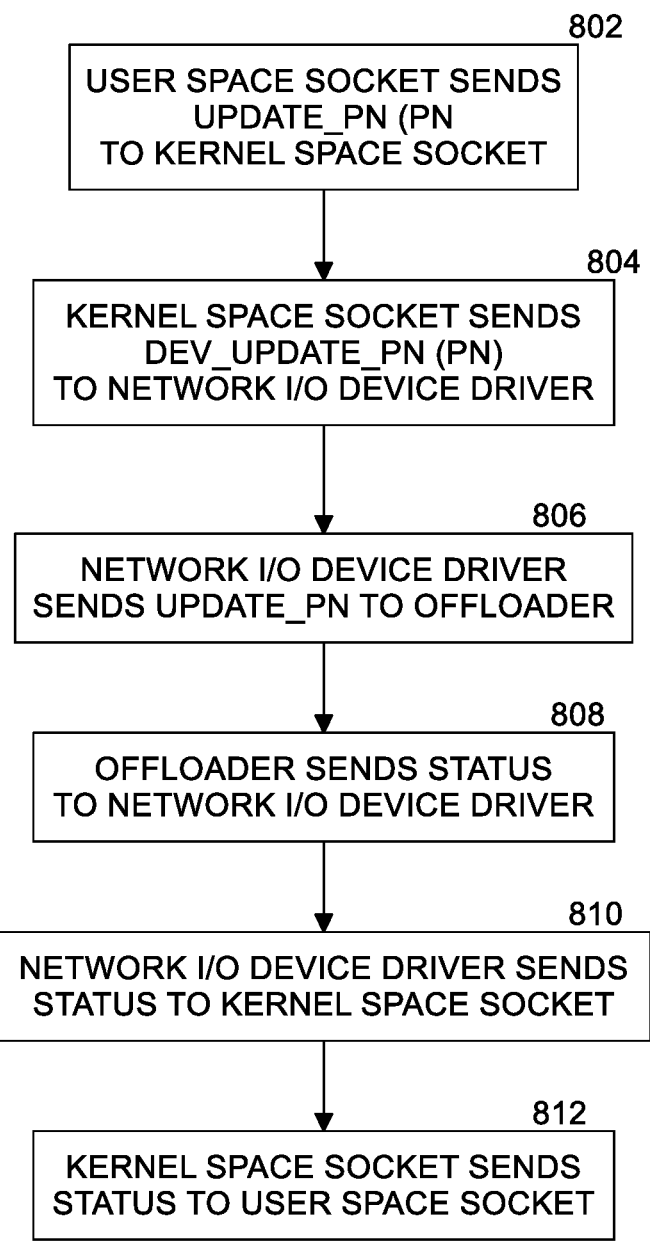
FIG. 8 is a flow diagram of an example QUIC offload update packet number operation.

FIG. 8 is a flow diagram of an example QUIC offload update packet number operation. The steps of FIG. 8 are performed any time a packet number (PN) is to be updated. At block 802, user space socket 162 sends an update PN command (UPDATE_PN) including a PN to a kernel space socket 152. At block 804, kernel space socket 152 sends a device update PN command (DEV_UPDATE_PN) with the PN to network I/O device driver 140. At block 806, network I/O device driver 140 sends the UPDATE_PN command 214 to offloader 135. Offloader 135 updates the PM in an entry in PN table 208 (ingress) or PN table 212 (egress). At block 808, offloader 135 sends a status 216 of the UPDATE_PN request back to network I/O device driver 140. At block 810, network I/O device driver 140 sends the status back to kernel space socket 152. At block 812, kernel space socket 152 sends the status back to user space socket 162.

Figure 9:
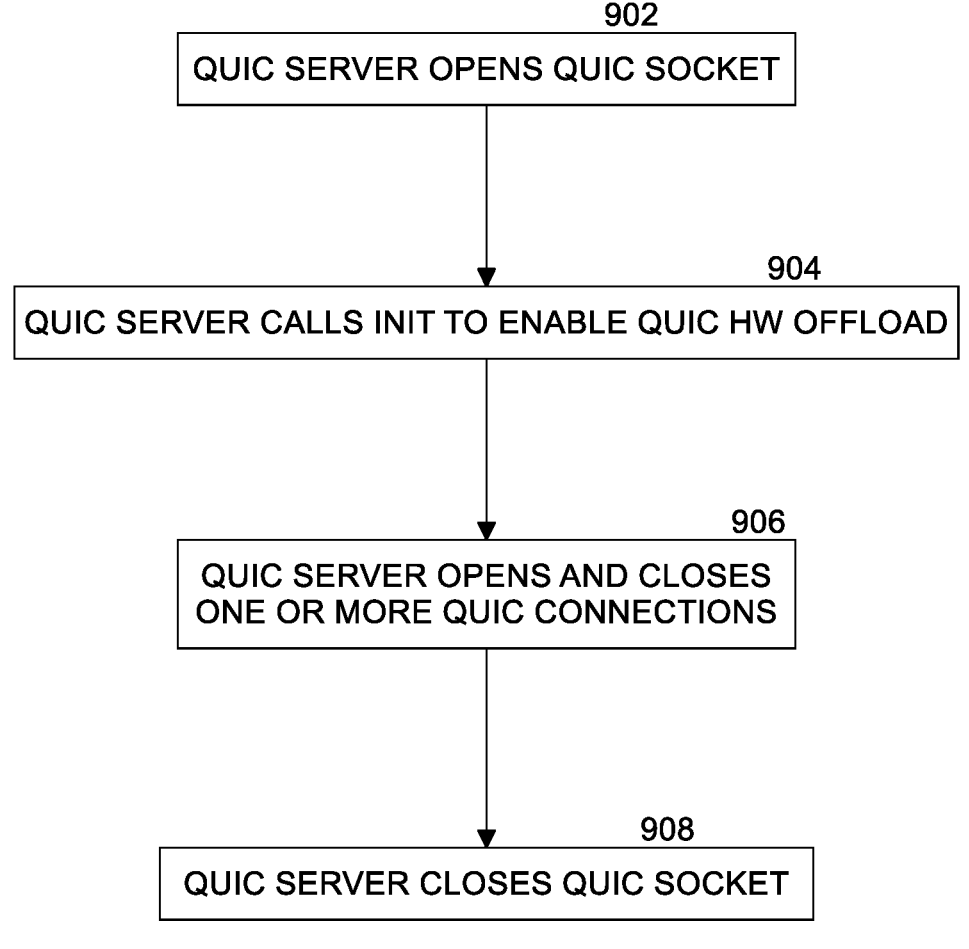
FIG. 9 is a flow diagram of an example QUIC connection lifecycle.

FIG. 9 is a flow diagram 900 of an example QUIC connection lifecycle. At block 902, QUIC server 166 opens a QUIC socket (e.g., user space socket 162). At block 904, QUIC server 166 call an initialization (INIT) function in the QUIC socket to enable hardware (HW) offload processing for packets. Once the HW offload capability is initialized, QUIC server 166 opens and closes one or more QUIC connections. When a QUIC connection is open, processing of QUIC packets may be offloaded to offloader 135. At block 908, QUIC server 166 closes the QUIC socket.

Figure 10:
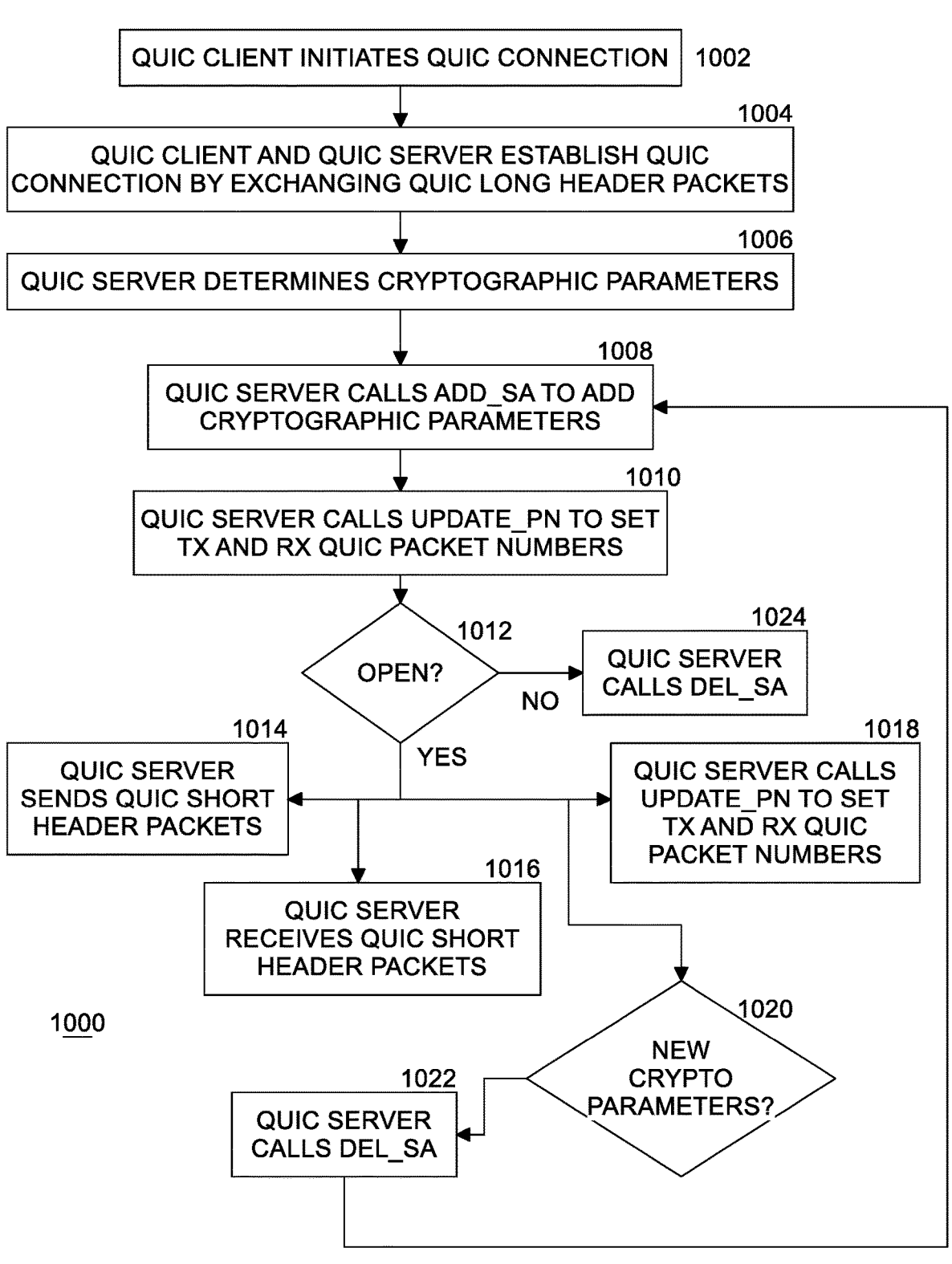
FIG. 10 is a flow diagram of example QUIC connection processing.

FIG. 10 is a flow diagram 1000 of example QUIC connection processing. At block 1002, QUIC client 164 initiates a QUIC connection. At block 1004, QUIC client 164 and QUIC server 166 establish the QUIC connection by exchanging QUIC Long Header packets (which do not need to be offloaded). At block 1006, QUIC server 166 determines cryptographic parameters to be used by offloader 135 to encrypt and/or decrypt packets. In an embodiment, different cryptographic parameters may be used for transmit (Tx) and receive (Rx) operations. Before packet traffic can be offloaded, the following steps are performed. At block 1008, QUIC server 166 calls the ADD SA command to add the Tx and/or Rx cryptographic parameters to offloader 135 so the offloader can process QUIC encryption and decryption of packets. At block 1010, QUIC server 166 calls the UPDATE_PN command to set Tx and Rx QUIC packet numbers when necessary (including before any packet traffic will be offloaded), that is, before offloader 135 will be unable to reconstitute a full packet number (PN). In an embodiment, packet numbers in a packet are encoded using fewer bits than the maximum allowed for packet numbers. For example, a packet number may be represented by one byte. Offloader 135 must be informed via the UPDATE_PN command of a recently sent full packet number such that the offloader can unambiguously calculate new packet numbers. See section 17.1 "Packet Number Encoding and Decoding" in the QUIC: A UDP-Based Multiplexed and Secure Transport specification.

While the QUIC connection is open (e.g., active) at block 1012, QUIC server 166 at block 1014 sends QUIC Short Header packets that may be offloaded using the cryptographic parameters to offloader 135 via the QUIC stack. As per the QUIC protocol, the QUIC server increments the packet number in the QUIC packet header by one for each packet sent. Processing continues back at block 1012. While the QUIC connection is open, QUIC server 166 at block 1016 receives QUIC Short Header packets with an indication of whether they have been decrypted (e.g., by the offloader) or still require decryption (for example, the Rx cryptographic parameters may have changed, but not yet been updated). Processing continues back at block 1012. While the QUIC connection is open, QUIC server 166 at block 1018 calls the UPDATE_PN command to set Tx and Rx QUIC packet numbers when necessary. Processing continues back at block 1012. While the QUIC connection is open, if the QUIC connection requires new Tx and/or RX cryptographic parameters at block 1020, QUIC server 166 at block 1022 calls the DEL_SA command to removed expired cryptographic parameters. Processing continues back at block 1012. When the QUIC connection is closed at block 1012, QUIC server 166 calls the DEL_SA command at block 1024 to remove the Tx and Rx cryptographic parameters.

FIG. 11 is a flow diagram 1100 of example packet transmission processing. At block 1102, in one embodiment QUIC server 166 sends a QUIC packet via a QUIC socket. In another embodiment, application 160 opens a QUIC socket and QUIC server 166 is implemented in the QUIC stack (e.g., 162, 152, 204). At block 1104, OS networking stack 204 processes the QUIC packet and sends the QUIC packet to network I/O device driver 140. The QUIC packet is identified in one of the following ways. First, network I/O device driver 140 may determine that the packet is a QUIC packet by examining the packet headers. Second, OS networking stack 204 may indicate that the packet is a QUIC packet by passing metadata to that effect to the device driver. Third, in one embodiment, offloader 135 is capable of detecting QUIC packets by parsing the packet. At block 1106, network I/O device driver 140 sends the QUIC packet to offloader 135. In an embodiment, network I/O device driver 140 uses descriptors in a descriptor ring to send the packet. The nature of the packet is determined by one of the following methods. For the first and second cases above, network I/O device driver 140 indicates to offloader 135 via metadata that the packet is a QUIC packet that should be processed further by the offloader. Metadata could be inserted in the packet or provided in descriptors. In one embodiment, metadata can furthermore describe the nature of the QUIC packet, including the header, such that the offloader may not be tied to a particular version of the QUIC protocol. Alternatively, for the third case above, the offloader parses the packet, identifying that the packet is a QUIC packet. Metadata can be used to describe the QUIC packet.

Assuming the packet is identified as a QUIC packet, offloader 135 determines the security association (SA) that is to be used to encrypt the packet at block 1108. The offloader may use information that uniquely identifies the QUIC connection, such as the QUIC Destination Connection ID. If the offloader fails to find a SA, the offloader reports an error back to network I/O device driver 140 and does not transmit the packet. Alternatively, another method involves a counter, which could be incremented when the packet is dropped, and requires the driver to read the counter to learn of dropped packets. At block 1110, offloader 135 determines the packet number for the QUIC packet from the QUIC packet contents and the SA's associated packet number. The packet number is used as an input parameter to the encryption process as described in the QUIC protocol specification, currently combined with the packet protection IV to form the nonce. At block 1112, offloader encrypts the QUIC payload of the packet. In an embodiment, offloader may apply header protection, as described in the QUIC protocol specification, which may include a process involving sampling of the packet's encrypted output in order to encrypt bits in the packet header, including the packet number. At block 1114, offloader 135 transmits the encrypted QUIC packet over connection 175 to network 170.

FIG. 12 is a flow diagram 1200 of example packet segmentation processing. In an embodiment, in order to minimize the number of communications between QUIC server 166 and offloader 135, packets are collected in a batch and sent to the offloader. Once cryptographic parameters have been determined and the QUIC connection has been opened, packet segmentation processing may be performed. At block 1202, QUIC server 166 coalesces a plurality of QUIC Short Header packets into a single large packet. Padding frames may be used at any time. Padding frames may be used to complete the MSS for packets, other than a last packet, that may be smaller than the MSS. At block 1204, QUIC server 166 prepares metadata specifying the MSS. At bloc 1206, QUIC server 166 transmits the single large packet through the socket. At block 1208, OS networking stack 204 attaches metadata to the large packet so that the metadata flows down the stack to network I/O device driver 140. At block 1210, the network I/O device driver extracts the metadata, converts the metadata to the offloader's format, and sends the large packet and the metadata to the offloader. At block 1212, offloader 135 receives the large packet and stores the IP and UDP headers of the large packet. At block 1214, offloader 1335 divides the large packet payload into a plurality of smaller payloads of size MSS until one segment (e.g., smaller payload) remains that is the MSS or smaller. At block 1216, offloader 135 replicates the IP and UDP headers, updating lengths and checksums, and transmits a packet for each payload segment created at block 1214. The number of packets transmitted is equal to the payload size divided by the MSS, rounded up, and the last packet may contain a payload size equal to or less than the MSS. If QUIC encryption is offloaded, each packet is transmitted as described at blocks 1108-1114 of FIG. 11.

FIG. 13 illustrates a flow diagram 1300 of example packet reception processing. At block 1302, offloader 135 in network I/O device 110 receives a QUIC packet over connection 175 from network 170. At block 1304, offloader parses the received packet, including the contents of the QUIC header. If the packet is identified as a QUIC packet, at block 1306 the offloader determines the SA that is to be used to decrypt the packet. The offloader uses information that uniquely identifies the QUIC connection, such as the QUIC Destination Connection ID. If the offloader fails to find a SA, the offloader sends the packet to network I/O device driver 140 without modification, indicating via metadata that this packet is a QUIC packet that was not processed by the offloader. In an embodiment, if QUIC header protection was used on the packet, the offloader removes the QUIC header protection. At block 1308, offloader 135 determines the packet number for the QUIC packet from the QUIC packet contents and the SA's associated packet number. The packet number is used as an input parameter to the decryption operation as described in the QUIC protocol specification, currently combined with the packet protection IV to form the nonce. At block 1310, the offloader decrypts the QUIC packet payload. At block 1312, the offloader sends the QUIC packet to network I/O device driver 140. In an embodiment, this is performed using descriptors in a descriptor ring, indicating via metadata that this packet is a QUIC packet that was processed by the offloader, and including processing information, such as the SA used to process the packet. At block 1314, network I/O device driver 140 sends the QUIC packet to OS networking stack 204. At block 1316, OS networking stack 204 delivers the QUIC packet to QUIC server 166 via the socket. In another embodiment, application 160 opens a QUIC socket and QUIC server 166 is implemented with the QUIC stack 162, 152, 204 in OS 150.

Figure 14:
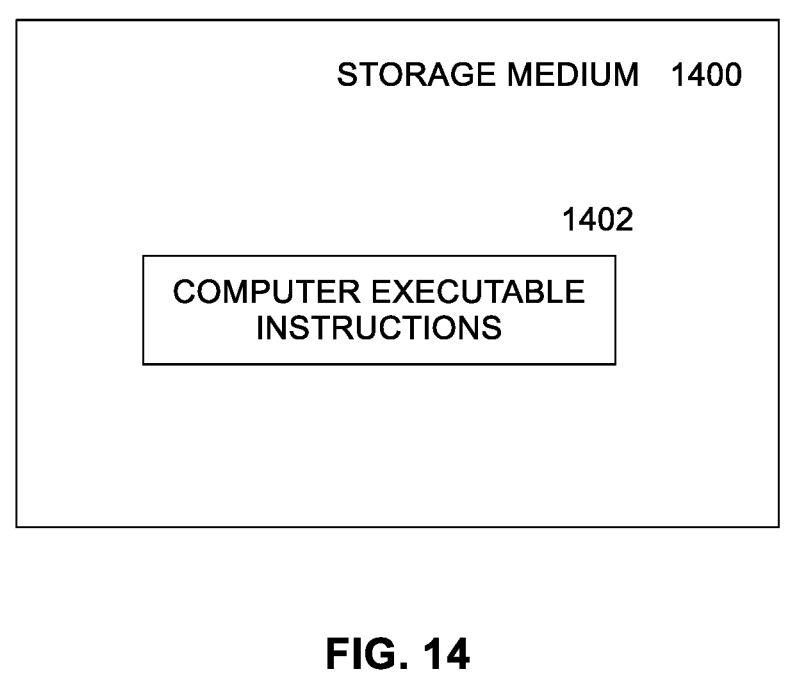

FIG. 14 illustrates an example of a storage medium 1400. Storage medium 1400 may comprise an article of manufacture. In some examples, storage medium 1400 may include any non-transitory computer readable medium or machine readable medium, such as an optical, magnetic or semiconductor storage. Storage medium 1400 may store various types of computer executable instructions, such as instructions 1402 to implement logic flows and pseudo code described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 15:
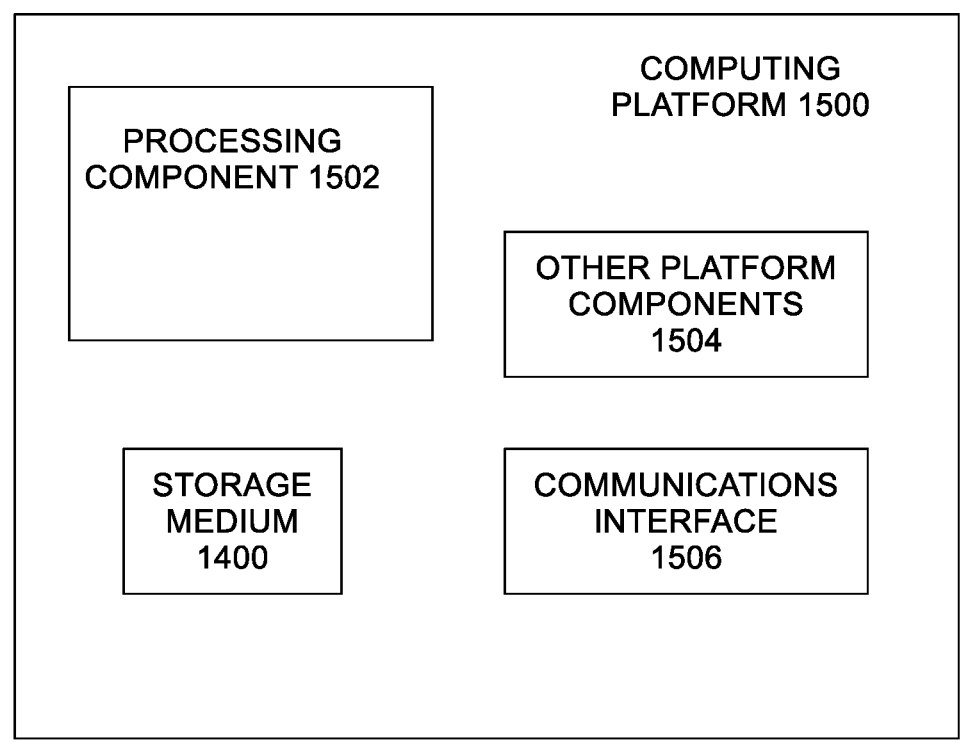
FIG. 15 illustrates an example computing platform.

FIG. 15 illustrates an example computing platform 1500. In some examples, as shown in FIG. 15, computing platform 1500 may include a processing component 1502, other platform components 1504 and/or a communications interface 1506.

According to some examples, processing component 1502 may execute processing operations or logic for instructions stored on storage medium 1400. Processing component 1502 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1504 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1506 may include logic and/or features to support a communication interface. For these examples, communications interface 1506 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 1500, including logic represented by the instructions stored on storage medium 1400 may be implemented using any combination of discrete circuitry, ASICs, logic gates and/or single chip architectures. Further, the features of computing platform 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory computer-readable medium comprising instructions stored thereon, that if executed by one or more processors, cause the one or more processors to:

based on configuration of a device to perform offloaded processing of Quick User Datagram Protocol (UDP) Internet Connections (QUIC) short header packets:

configure the device to perform processing of QUIC short header packets by sending one or more communications to the device to configure the device with: source connection identifier (ID), destination connection ID, and QUIC cryptographic parameters comprising a QUIC key phase flag and to configure the device to track packet numbers of received and transmitted QUIC packets for cryptographic operations, wherein the device is to perform decryption of received QUIC short header packets based on the QUIC cryptographic parameters; and based on the device not being configured to perform offload processing of the QUIC short header packets, cause processing of the QUIC short header packets received from the device by a host system executed software, wherein the processing of the QUIC short header packets received from the device by the host system executed software includes decrypting the short header packets and wherein the host system executed software is to process the QUIC short header packets received from the device by access to the source connection ID, the destination connection ID, and the QUIC cryptographic parameters.

2. The at least one computer-readable medium of claim 1, wherein the processing of QUIC short header packets by the device comprises:

encrypting QUJIC short header packets prior to transmission.

3. The at least one computer-readable medium of claim 1, wherein the processing of QUIC short header packets by the device comprises:

tracking packet numbers of QUIC short header packets and encrypting QUIC short header packets based on the tracked packet numbers prior to transmission.

4. The at least one computer-readable medium of claim 1, wherein the processing of QUIC short header packets by the device comprises:

decrypting received QUIC short header packets.

5. The at least one computer-readable medium of claim 1, wherein the processing of QJIC short header packets by the device comprises:

tracking packet numbers of received QUIC short header packets and decrypting the received QUIC short header packets based on the tracked packet numbers.

6. The at least one computer-readable medium of claim 1, wherein an operating system (OS) comprises the instructions.

7. The at least one computer-readable medium of claim 1, comprising instructions stored thereon, that if executed by one or more processors, cause the one or more processors to:

setting up a connection with a second device based on transmission of QUIC long header packets.

8. An apparatus comprising:

a network interface controller comprising:

a host interface;

a physical layer interface (PHY) circuitry;

a media access control (MAC) circuitry; and circuitry to perform offload operations from a host system, when communicatively coupled to the host interface, the offload operations comprising:

based on configuration of the network interface controller to perform offloaded processing of Quick User Datagram Protocol (UDP) Internet Connections (QUIC) short header packets:

configure the circuitry to perform processing of QUIC short header packets based on received communications with source connection identifier (ID), destination connection ID, and QUIC cryptographic parameters comprising a QUIC key phase flag and received communications associated with packet number tracking of received and transmitted QUIC packets for cryptographic operations and process at least one received QUIC short header packet by decryption of the at least one received QUIC short header packet based on the QUIC cryptographic parameters and based on the network interface controller not being configured to perform offload processing of the QUIC short header packets, provide at least one unprocessed QUIC short header packet for processing by a software executed by the host system, wherein the processing by the software executed by the host system includes decryption of the unprocessed QUIC short header packet and wherein software executed by the host system is to process the QUIC short header packet received from the network interface controller by access to the source connection ID, the destination connection ID, and the QUIC cryptographic parameters.

9. The apparatus of claim 8, wherein the process the QUIC short header packets comprises:

encrypt QUIC short header packets prior to transmission.

10. The apparatus of claim 8, wherein the process the QUIC short header packets comprises:

track packet numbers of QUIC short header packets and encrypt QUIC short header packets based on the tracked packet numbers prior to transmission.

11. The apparatus of claim 8, wherein the process the QUIC short header packets comprises:

decrypt received QUIC short header packets.

12. The apparatus of claim 8, wherein the process the QUIC short header packets comprises:

track packet numbers of received QUIC short header packets and decrypt the received QUIC short header packets based on the tracked packet numbers.

13. A method comprising:

based on configuration of a device to perform offloaded processing of Quick User Datagram Protocol (UDP) Internet Connections (QUIC) short header packets:

configuring the device to perform processing of QUIC short header packets by sending one or more communications to the device to configure the device with source connection identifier (ID), destination connection ID, and QUIC cryptographic parameters comprising a QUIC key phase flag and to configure the device to track packet numbers of received and transmitted QUIC packets for cryptographic operations, wherein the processing of QUIC short header packets comprises decryption of received QUIC short header packets based on the QUIC cryptographic parameters; and based on the device not being configured to perform offload processing of the QUIC short header packet, causing processing of the QUIC short header packets, received by the device, by a host system executed software, wherein the processing of the QUIC short header packets includes decrypting the short header packets and wherein the host system executed software processes the QUIC short header packets received from the device by access to the source connection ID, the destination connection ID, and the QUIC cryptographic parameters.

14. The method of claim 13, wherein the processing of QUJIC short header packets by the device comprises:
encrypting QUI short header packets prior to transmission.

15. The method of claim 13, wherein the processing of QUIC short header packets by the device comprises:
tracking packet numbers of QUIC short header packets and
encrypting QUIC short header packets based on the tracked packet numbers prior to transmission.

16. The method of claim 13, wherein the processing of QUIC short header packets by the device comprises:
decrypting received QUIC short header packets.

17. The method of claim 13, wherein the processing of QUIC short header packets by the device comprises:
tracking packet numbers of received QUIC short header packets and
decrypting the received QUIC short header packets based on the tracked packet numbers.

18. The method of claim 13, wherein an operating system (OS) performs the configuring the device to perform processing of QUIC short header packets and causing processing of at least one QUIC short header packet received from the device by a host system executed software based on the device not performing offload processing of the at least one QUIC short header packet.

19. The method of claim 13, comprising:
setting up a connection with a second device based on transmission of QUIC long header packets.

20. The method of claim 13, wherein the device comprises a network interface device.

* * * * *